E. G. GRAHAM.
CONCRETE MIXER.
APPLICATION FILED OCT. 21, 1919.

1,367,374.

Patented Feb. 1, 1921.
2 SHEETS—SHEET 1.

Witnesses

Inventor
E. G. Graham
By Victor J. Evans
Attorney

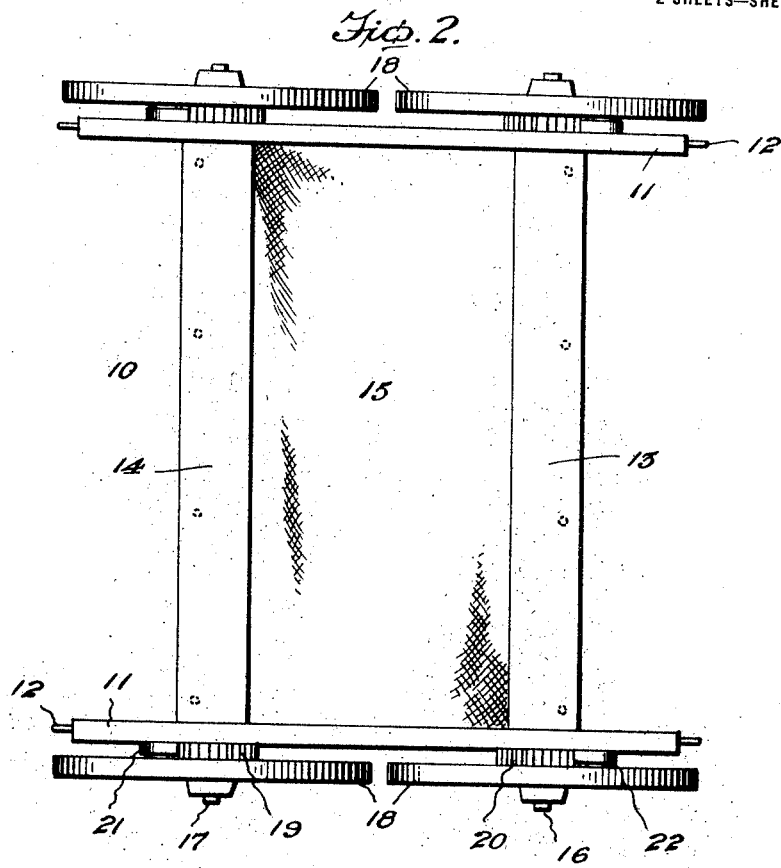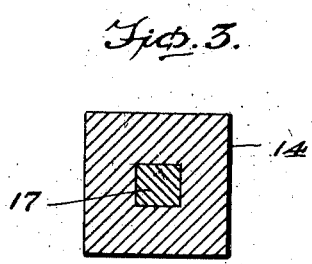

UNITED STATES PATENT OFFICE.

EDWIN G. GRAHAM, OF PALISADES, COLORADO.

CONCRETE-MIXER.

1,367,374.   Specification of Letters Patent.   Patented Feb. 1, 1921.

Application filed October 21, 1919. Serial No. 332,236.

*To all whom it may concern:*

Be it known that I, EDWIN G. GRAHAM, a citizen of the United States, residing at Palisades, in the county of Mesa and State of Colorado, have invented new and useful Improvements in Concrete-Mixers, of which the following is a specification.

This invention relates to concrete mixers and has for its object the provision of a concrete mixing device involving the use of a flexible sheet of canvas or other suitable material similar to a rolling door, in which the mixing action is accomplished by placing the aggregate upon the sheet and then lifting the sheet by the corners or by two opposite sides.

An important object is the provision of a device of this character in which wheels are provided for supporting a frame within which is journaled drums to which are secured the ends of the flexible sheet, clutch mechanism being provided between the wheels and drums whereby upon movement of the device over the ground back and forth the sheet will be moved to cause mixing action of the aggregate, the clutch arrangement being operable to cause the sheet to be elevated from the ground and supported in elevated position so that the device may be transported from place to place after the aggregate is mixed.

With the above and other objects and advantages in view, the invention consists in the details of construction to be hereinafter more fully described and claimed and illustrated in the accompanying drawings in which—

Fig. 2 is a plan view,

Fig. 3 is a cross sectional view taken through one of the axles or drums, and

Figure 1:
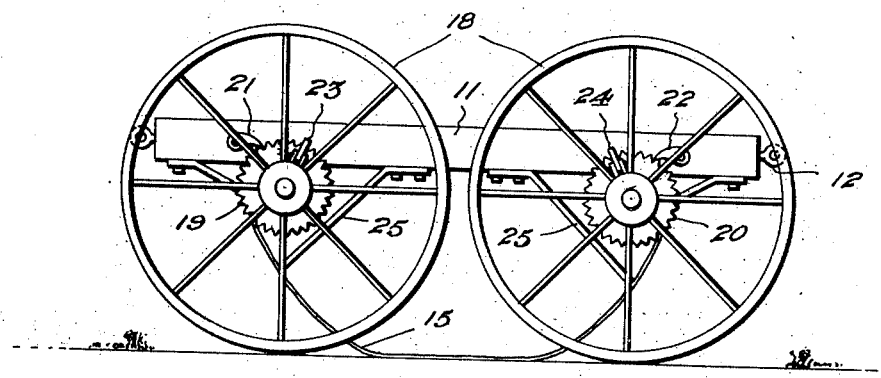
Figure 1 is a side elevation of the device.
Figure 4:
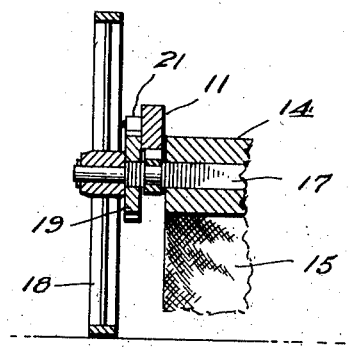
Fig. 4 is a longitudinal section showing the clutch arrangement.

Referring more particularly to the drawings, I have shown my device as comprising a rectangular frame 10 formed of suitable side bars 11 which may be connected by cross bars if desired and to which is secured any suitable draft device 12 by means of which the device may be pulled from place to place.

Journaled within the frame 10 are drums 13 and 14 which are preferably square in cross section. Secured upon these drums are the ends of a sheet 15 of canvas or other suitable flexible material upon which is disposed the gravel, sand and cement to be mixed. Extending through the drums 13 and 14 and revoluble therewith are axles 16 and 17, upon the ends of which are revolubly mounted wheels 18. It will be seen that ordinarily the wheels rotate with respect to the frame and drums without affecting the position of the flexible sheet on the drums.

Secured upon the axles at the ends thereof are ratchets 19 and 20 with which coöperate pawls 21 and 22 pivoted upon the frame bars 11. Other pawls 23 and 24 are mounted upon the wheels 18 and are also movable into engagement with the ratchets 19 and 20, respectively.

Bolted upon the under sides of the frame bars 11 are inclined plates 25 which diverge downwardly and which have their free edges bearing against the flexible sheet 15 adjacent its connection with the drums.

In the operation of the device, with the sheet 15 disposed flat upon the ground, the various constituents of the concrete to be mixed are placed upon the sheet. The pawls 23 and 24 are then moved into engagement with the ratchets 19 and 20, the pawls 21 and 22 are swung out of engagement with the ratchets, and the device is then pulled back and forth. When the device is pulled in one direction it will be seen that the rotation of the wheels will result in winding of the sheet 15 upon one drum and unwinding from the other drum as one set of wheels will have driving connection with the associated drum owing to the engagement of the pawls carried by the wheels with the ratchets. When the device is pulled in the other direction, it will be seen that the other drum will wind the flexible sheet and the drum which was previously winding will unwind. As this is done it will be seen that the sheet 15 will be moved beneath the mass of aggregate thereon and as is well known or as can be practically demonstrated by experiment, this movement of the sheet will result in thorough co-mingling of the aggregate. The sheet must be relatively wide or the amount of aggregate relatively small so as to prevent the mass from slipping off the edges of the sheet. When the constituents have been thus mixed and it is desired to transport the load to the place where it is desired to pour the same, it is first necessary to pull the device in one direction to throw the pawls 21 and 22 into engagement with the ratchets and then to wind the flexible sheet 15 slightly upon one of the drums. The device is then pulled in the other direction whereupon the drum 14 will also wind the opposite edge of the sheet thereonto. Both drums will then be held stationary and will support the load and after the pawls 23 and 24 are disengaged from the ratchets the device is free to be moved from place to place without the wheels 18 affecting the position of the sheet. The function of the scraper blades 25 is to scrape the concrete from the sheet 15 as the sheet approaches the drums during their winding, as will be quite obvious.

From the foregoing description and a study of the drawings it will be apparent that I have thus provided a very simply constructed and inexpensive device which is readily adapted for use in the mixing of concrete in a thorough and efficient manner, the device being also so arranged as to provide means for transporting the mixture to the place where its use is desired.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising a frame, a pair of axles journaled transversely of said frame and arranged in spaced parallel relation, wheels rotatably mounted on said axles, drums secured upon said axles to rotate therewith, a flexible sheet having its ends secured to and adapted to wind upon said drums in opposite directions and having its intermediate portion adapted to depend so as to be on a level with the lower edge of the wheel, ratchets secured upon the ends of said axles with the teeth of the ratchets on one axle arranged oppositely to those of the ratchets on the other axle, pawls pivoted upon said frame and movable to be engaged with or disengaged from said ratchets, said pawls being also oppositely disposed, and other pawls carried by the wheels and engageable with said ratchets whereby said ratchets and consequently said drums may be locked with respect to the wheels so as to rotate therewith.

In testimony whereof I affix my signature.

EDWIN G. GRAHAM.